United States Patent
Yang et al.

(10) Patent No.: US 12,181,841 B2
(45) Date of Patent: Dec. 31, 2024

(54) REAL-TIME MEASUREMENT METHOD AND SYSTEM FOR ULTRAFAST SPACE-TIME-FREQUENCY INFORMATION BASED ON SPACE-TIME-FREQUENCY COMPRESSION

(71) Applicant: SOUTH CHINA UNIVERSITY OF TECHNOLOGY, Guangzhou (CN)

(72) Inventors: Zhongmin Yang, Guangzhou (CN); Yuankai Guo, Guangzhou (CN); Xiaoming Wei, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 294 days.

(21) Appl. No.: 17/946,051

(22) Filed: Sep. 16, 2022

(65) Prior Publication Data

US 2023/0016454 A1 Jan. 19, 2023

Related U.S. Application Data

(63) Continuation of application No. PCT/CN2020/124573, filed on Oct. 29, 2020.

(30) Foreign Application Priority Data

Jun. 25, 2020 (CN) .......................... 202010592144.6

(51) Int. Cl.
*G04F 13/02* (2006.01)
*G01J 11/00* (2006.01)
*G01S 7/295* (2006.01)

(52) U.S. Cl.
CPC ............ *G04F 13/026* (2013.01); *G01J 11/00* (2013.01); *G01S 7/295* (2013.01)

(58) Field of Classification Search
CPC .......... G04F 13/026; G01J 11/00; G01S 7/295
See application file for complete search history.

(56) References Cited

U.S. PATENT DOCUMENTS

| | | | |
|---|---|---|---|
| 9,397,463 B2 * | 7/2016 | Da Costa Ribeiro De Miranda et al. | H01S 3/0057 |
| 2012/0062876 A1 * | 3/2012 | Bennett | G01J 11/00 356/213 |

(Continued)

FOREIGN PATENT DOCUMENTS

| CN | 109799196 | 5/2019 |
|---|---|---|
| CN | 110186578 | 8/2019 |
| CN | 111795753 | 10/2020 |

OTHER PUBLICATIONS

"International Search Report (Form PCT/ISA/210) of PCT/CN2020/124573", mailed on Mar. 26, 2021, with English translation thereof, pp. 1-4.

(Continued)

*Primary Examiner* — Dominic J Bologna
(74) *Attorney, Agent, or Firm* — JCIPRNET

(57) ABSTRACT

The present application relates to a real-time measurement method and system for ultrafast space-time-frequency three-domain information based on space-time-frequency compression. The method includes: generating an ultrafast-pulse optical signal in a to-be-observed physical system; performing intensity-modulated spatial encoding on the ultrafast-pulse optical signal; arranging, by a space-time editor, a time-domain series of an encoded ultrafast-pulse optical signal in a horizontal space direction; performing, by a frequency-space editor, frequency spectral processing on a space-time distribution encoding form of the encoded ultrafast-pulse optical signal; performing, by a frequency-time delayer, frequency-time delaying on an encoded space-time-frequency synchronized ultrafast-pulse optical signal; per- (Continued)

forming, by an area array detector, real-time compression and acquisition on a high-frequency-resolution encoded space-time-frequency synchronized ultrafast-pulse optical signal, to obtain compressed encoded data information; and decompressing and decoding data according to the compressed encoded data information, to obtain space-time-frequency three-domain synchronization information of the ultrafast-pulse optical signal.

20 Claims, 6 Drawing Sheets

(56) References Cited

U.S. PATENT DOCUMENTS

| | | | |
|---|---|---|---|
| 2021/0010835 A1* | 1/2021 | Shang | G01D 5/35387 |
| 2022/0271493 A1* | 8/2022 | Kane | H01S 3/0078 |
| 2022/0299374 A1* | 9/2022 | Yang | G01J 9/00 |

OTHER PUBLICATIONS

Li, Runfeng et al., "High Spatiotemporal Imaging Based on Optical Field Engineering", Acta Optica Sinica, vol. 39, Issue 1, Jan. 2019, with English abstract, pp. 1-15.

* cited by examiner

REAL-TIME MEASUREMENT METHOD AND SYSTEM FOR ULTRAFAST SPACE-TIME-FREQUENCY INFORMATION BASED ON SPACE-TIME-FREQUENCY COMPRESSION

CROSS-REFERENCE TO RELATED APPLICATION

This application is a continuation of international application of PCT application serial no. PCT/CN2020/124573 filed on Oct. 29, 2020, which claims the priority benefit of China application no. 202010592144.6 filed on Jun. 25, 2020. The entirety of each of the above mentioned patent applications is hereby incorporated by reference herein and made a part of this specification.

BACKGROUND

Technical Field

The present invention relates to the field of ultrafast-signal measurement technologies, and in particular to a real-time measurement method and system for ultrafast space-time-frequency information based on space-time-frequency compression.

Description of Related Art

Ultrafast pulse lasers are widely used in various disciplines due to the characteristics such as a short duration, high peak power, and a wide spectrum. Ultrafast optical fields (as short as picoseconds and femtoseconds) have the same or similar dynamical processes as many natural phenomena in the atmosphere and water. The study of ultrafast optical field dynamics is vital to prevent and cope with many disasters caused by atmospheric and water dynamics. After years of development, a variety of techniques and methods have been developed for ultrafast optical field time-domain measurement, such as the autocorrelation technique for estimating femtosecond and picosecond pulse widths, and the frequency-resolved optical gating (FROG) technique and the spectral phase interferometry for direct electric-field reconstruction (SPIDER) technique for characterizing full-field information (an amplitude and a phase) of a femtosecond pulse. Both the FROG technique and SPIDER technique have ultra-high time domain resolution (up to the fs level). However, the ultrafast optical field often has a spatial complexity, that is, signals in different spatial positions are different. The foregoing traditional measurement scheme only has the resolving power in the time domain, and cannot obtain the spatial information and frequency information of the ultrafast optical field synchronously, which leads to the one-sidedness of the obtained result.

SUMMARY

Technical Solutions

An objective of the present invention is to provide a real-time measurement method and system for ultrafast space-time-frequency three-domain information based on space-time-frequency compression, and break through the limitation that the related art cannot measure space-time-frequency three-domain synchronization information in real time, and full-field information.

A real-time measurement method for ultrafast space-time-frequency information based on space-time-frequency compression includes:
  generating an ultrafast-pulse optical signal in a to-be-observed physical system;
  performing intensity-modulated spatial encoding on the ultrafast-pulse optical signal, to obtain an encoded ultrafast-pulse optical signal;
  arranging a time-domain series of the encoded ultrafast-pulse optical signal in a horizontal space direction, to obtain a space-time distribution encoding form of the encoded ultrafast-pulse optical signal;
  performing frequency spectral processing on the space-time distribution encoding form of the encoded ultrafast-pulse optical signal, and loading frequency information of each ultrafast pulse on vertical spatial information, to obtain an encoded space-time-frequency synchronized ultrafast-pulse optical signal;
  performing frequency-time delaying on the encoded space-time-frequency synchronized ultrafast-pulse optical signal, to obtain a high-frequency-resolution encoded space-time-frequency synchronized ultrafast-pulse optical signal;
  performing real-time compression and acquisition on the high-frequency-resolution encoded space-time-frequency synchronized ultrafast-pulse optical signal, to obtain compressed encoded data information; and
  decompressing and decoding data according to the compressed encoded data information, to obtain space-time-frequency three-domain synchronization information of the ultrafast-pulse optical signal.

In an embodiment, the ultrafast-pulse optical signal is an ultrafast space-time mode-locked pulse.

In an embodiment, the data is decompressed and decoded by using a two-step iterative shrinkage/thresholding algorithm, to obtain the space-time-frequency three-domain synchronization information of the ultrafast-pulse optical signal.

The present invention further provides a real-time measurement system for ultrafast space-time-frequency three-domain information based on space-time-frequency compression, which is configured to implement the method provided by the present invention, and includes:
  an ultrafast-pulse optical signal generation module configured to generate an ultrafast-pulse optical signal in a to-be-observed physical system;
  a spatial encoding module configured to perform intensity-modulated spatial encoding on the ultrafast-pulse optical signal, to obtain an encoded ultrafast-pulse optical signal;
  a space-time arrangement module configured to arrange a time-domain series of the encoded ultrafast-pulse optical signal in a horizontal space direction, to obtain a space-time distribution encoding form of the encoded ultrafast-pulse optical signal;
  a frequency-space editing module configured to perform frequency spectral processing on the space-time distribution encoding form of the encoded ultrafast-pulse optical signal, and load frequency information of each ultrafast pulse on vertical spatial information, to obtain an encoded space-time-frequency synchronized ultrafast-pulse optical signal;
  a frequency-time delaying module configured to perform frequency-time delaying on the encoded space-time-frequency synchronized ultrafast-pulse optical signal, to obtain a high-frequency-resolution encoded space-time-frequency synchronized ultrafast-pulse optical signal;

a compressed encoded data acquisition module configured to acquire the high-frequency-resolution encoded space-time-frequency synchronized ultrafast-pulse optical signal, to obtain compressed encoded data information; and a decompressing and decoding module configured to decompress and decode data according to the compressed encoded data information, to obtain space-time-frequency three-domain synchronization information of the ultrafast-pulse optical signal.

In an embodiment, the spatial encoding module is a digital micromirror device.

In an embodiment, the space-time arrangement module is an acousto-optic modulator.

In an embodiment, the frequency-space editing module is a diffraction grating.

In an embodiment, the frequency-time delaying module is a pair of long dielectric-film reflection mirrors placed at a specific angle. Light beams of different frequencies are reflected a plurality of times through the pair of long mirrors to delay time.

In an embodiment, the compressed encoded data acquisition module is an area array detector, and when the area array detector acquires the high-frequency-resolution encoded space-time-frequency synchronized ultrafast-pulse optical signal, signals overlap and are compressed in space, and pieces of time and frequency information loaded on the spatial information overlap and are compressed synchronously.

In an embodiment, the area array detector is a charge-coupled device camera.

Beneficial Effects

Compared with the related art, the present invention has at least the following beneficial effects.

Space-time-frequency synchronization information of an ultrafast optical field is measured super quickly in real time. After the ultrafast optical field is encoded, time information and frequency information are superimposed on spatial information, overlapped, and are compressed with it. An area array detector is configured to acquire data. A two-step iterative shrinkage/thresholding algorithm is used for decoding and inverting, thereby measuring ultrafast space-time-frequency three-domain information in real time. The present invention eliminates limitations in various aspects of the related art, and has a broad application prospect in the ultrafast measurement.

DESCRIPTION OF THE EMBODIMENTS

In order to make the purpose, technical solutions and advantages of the present application more understandable, the present application is further described below in detail with reference to the accompanying drawings and embodiments. It should be understood that the specific embodiments described herein are only used to explain the present application, but not to limit the present application.

A particular feature, structure, or characteristic described in an "embodiment" mentioned herein can be included in at least one embodiment of the present application. Embodiments appear in some places in this specification do not necessarily refer to the same one, and are not independent or alternative embodiments that are mutually exclusive with other embodiments either. It is explicitly and implicitly understood by those skilled in the related art that the embodiments described herein may be combined with other embodiments.

Figure 1:
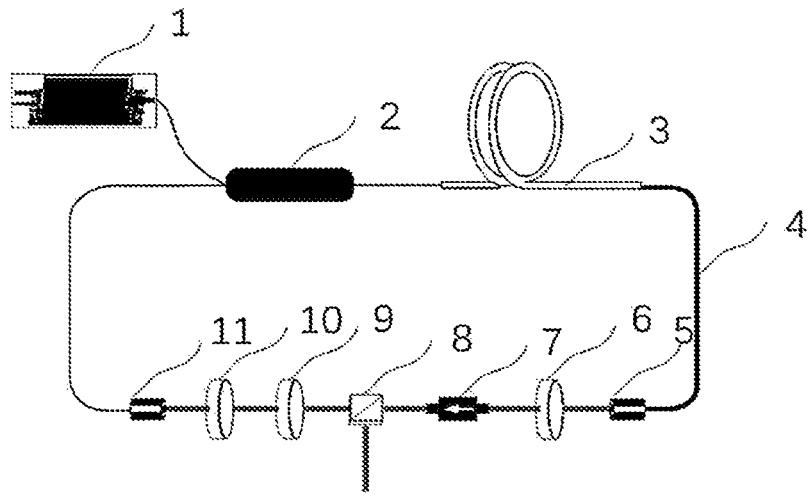
FIG. 1 is a schematic diagram of an optical path for generating an ultrafast-pulse optical signal according to an embodiment.

In an embodiment, an optical path generating an ultrafast-pulse optical signal in FIG. 1 is used and includes a multimode semiconductor pump source 1, a beam combiner 2, a gain fiber 3, a graded index fiber 4, a first collimator 5, a half-wave plate 6, a polarization dependent isolator 7, a first optical beam splitter 8, a ¼ wave plate 9, a band pass filter 10, and a second collimator 11. The optical path generates an ultrafast space-time mode-locked pulse signal by using a nonlinear polarization rotation technique. The multimode semiconductor pump source 1 provides a pump light signal. The pump light signal is coupled into the gain fiber 3 through the beam combiner 2, such that the population inversion occurs in the gain fiber. The half-wave plate 6, the polarization dependent isolator 7, the ¼ wave plate 9, and the band pass filter 10 provide nonlinear polarization rotation throughout a laser cavity. The laser cavity outputs an ultrafast space-time mode-locked pulse signal through the first optical beam splitter 8.

Figure 2:
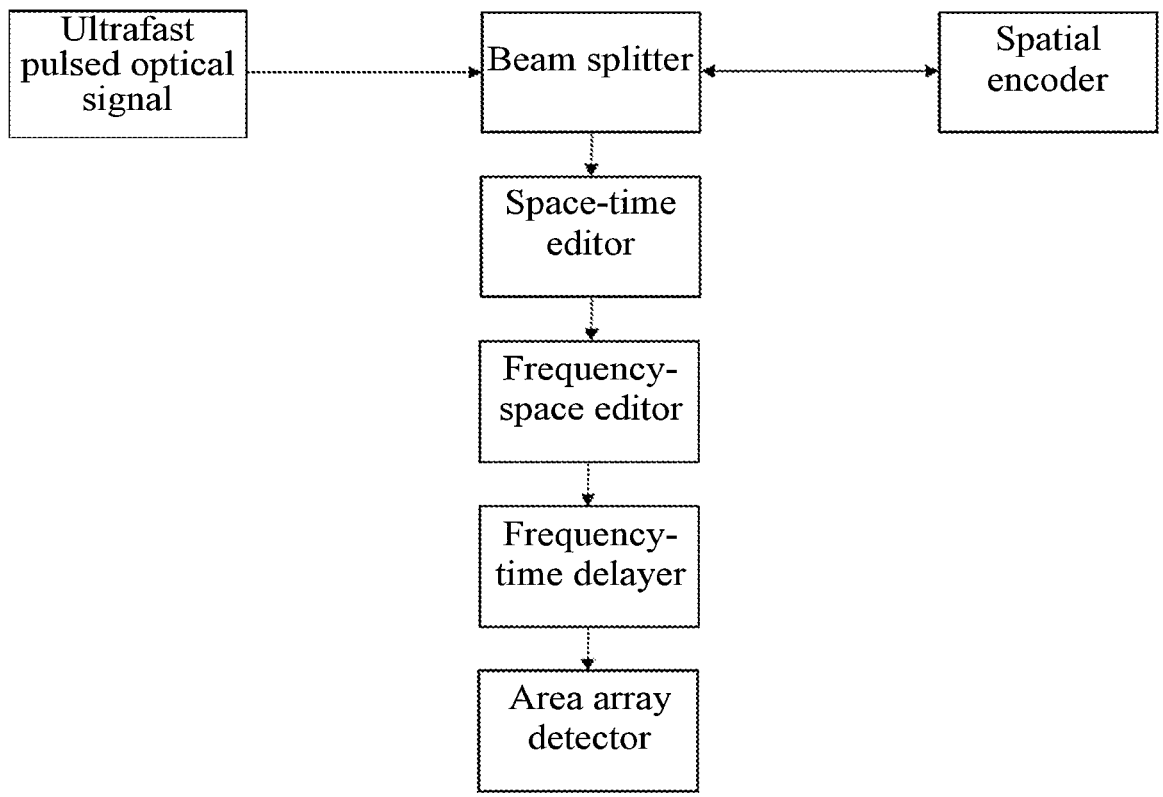
FIG. 2 is a structural block diagram of a real-time measurement system for ultrafast space-time-frequency three-domain information based on space-time-frequency compression according to an embodiment.
Figure 3:
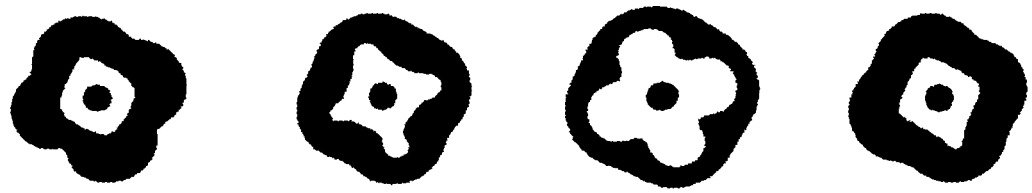
FIG. 3 is a schematic distribution diagram of spatial light spots of a set of ultrafast-pulse optical signals according to an embodiment.
Figure 4:
FIG. 4 is a schematic distribution diagram of spatial light spots of a set of encoded ultrafast-pulse optical signals according to an embodiment.
Figure 6:
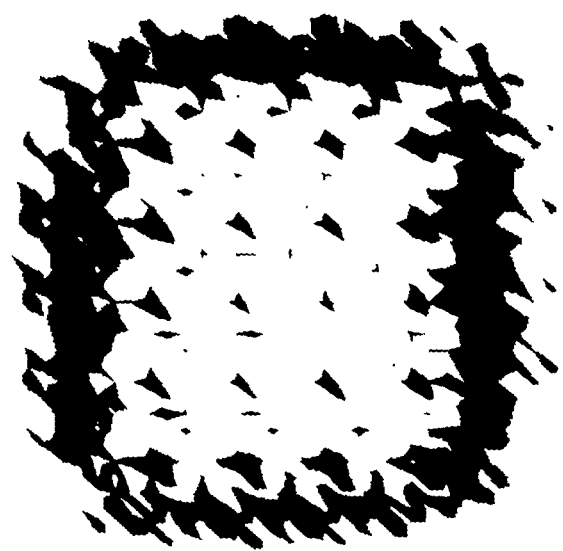
FIG. 6 is a schematic diagram of compressed encoded data information according to an embodiment.
Figure 7:
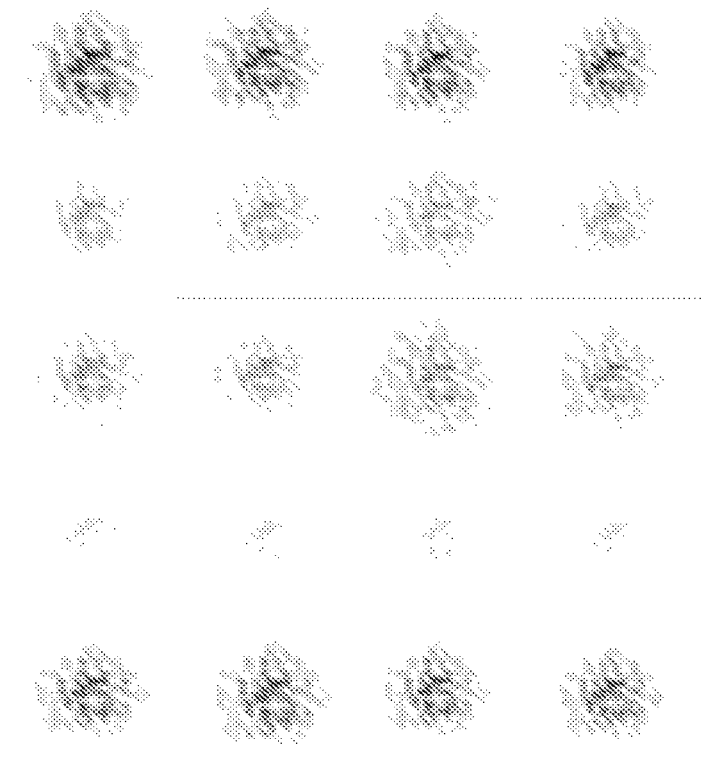
FIG. 7 is a schematic diagram of an encoded space-time-frequency synchronized ultrafast-pulse optical signal according to an embodiment.
Figure 8:
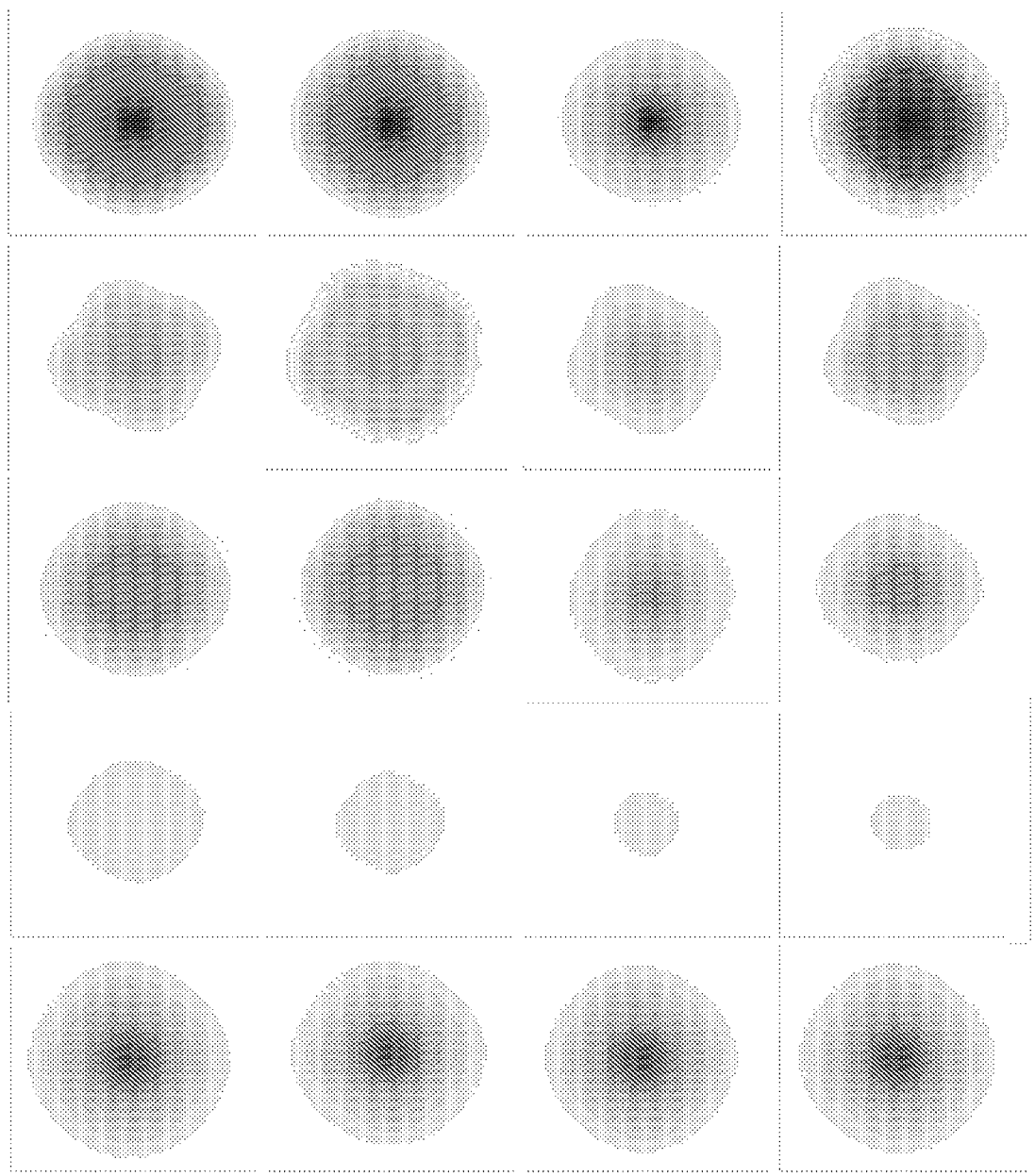
FIG. 8 is a schematic diagram of a space-time-frequency signal of an ultrafast optical field according to an embodiment.

In an embodiment, as shown in FIG. 2, a real-time measurement method for ultrafast space-time-frequency information based on space-time-frequency compression includes:

generating an ultrafast-pulse optical signal in a to-be-observed physical system by using, for example, a nonlinear polarization rotation technique, where FIG. 3 shows a distribution diagram of a spatial light spot of an ultrafast pulse signal;

performing intensity-modulated spatial encoding on the ultrafast-pulse optical signal, to obtain an encoded ultrafast-pulse optical signal, where FIG. 4 shows a schematic distribution diagram of a spatial light spot of an encoded ultrafast-pulse optical signal;

arranging a time-domain series of the encoded ultrafast-pulse optical signal in a horizontal space direction, to obtain a space-time distribution encoding form of the encoded ultrafast-pulse optical signal;

performing frequency spectral processing on the space-time distribution encoding form of the encoded ultrafast-pulse optical signal, and loading frequency information of each ultrafast pulse on vertical spatial information, to obtain an encoded space-time-frequency synchronized ultrafast-pulse optical signal, as shown in FIG. 7;

performing frequency-time delaying on the encoded space-time-frequency synchronized ultrafast-pulse optical signal, to obtain a high-frequency-resolution encoded space-time-frequency synchronized ultrafast-pulse optical signal;

performing real-time compression and acquisition on the high-frequency-resolution encoded space-time-frequency synchronized ultrafast-pulse optical signal, to obtain compressed encoded data information shown in FIG. 6; and decompressing and decoding data according to the compressed encoded data information by using a two-step iterative shrinkage/thresholding algorithm, to obtain space-time-frequency three-domain synchronization information of the ultrafast-pulse optical signal.

In an embodiment, the ultrafast-pulse optical signal is an ultrafast space-time mode-locked pulse.

Figure 5:
FIG. 5 is a schematic diagram of a code of a spatial encoding component according to an embodiment.

In an embodiment, with reference to FIG. 2, a real-time measurement system for ultrafast space-time-frequency three-domain information based on space-time-frequency compression is provided and includes:

an ultrafast-pulse optical signal generation module configured to generate an ultrafast-pulse optical signal in a to-be-observed physical system by using, for example, a nonlinear polarization rotation technique, where the generated ultrafast-pulse optical signal reaches a spatial encoding module through an optical beam splitter;

a spatial encoding module configured to perform intensity-modulated spatial encoding on the ultrafast-pulse optical signal, to obtain an encoded ultrafast-pulse optical signal, where FIG. 5 shows a schematic diagram of a code of the spatial encoding module, and the obtained encoded ultrafast-pulse optical signal is reflected to a space-time encoding module through the optical beam splitter;

a space-time arrangement module configured to arrange a time-domain series of the encoded ultrafast-pulse optical signal in a horizontal space direction, to obtain a space-time distribution encoding form of the encoded ultrafast-pulse optical signal;

a frequency-space editing module configured to perform frequency spectral processing on the space-time distribution encoding form of the encoded ultrafast-pulse optical signal, and load frequency information of each ultrafast pulse on vertical spatial information, to obtain an encoded space-time-frequency synchronized ultrafast-pulse optical signal;

a frequency-time delaying module configured to perform frequency-time delaying on the encoded space-time-frequency synchronized ultrafast-pulse optical signal, to obtain a high-frequency-resolution encoded space-time-frequency synchronized ultrafast-pulse optical signal;

a compressed encoded data acquisition module configured to acquire the high-frequency-resolution encoded space-time-frequency synchronized ultrafast-pulse optical signal, to obtain compressed encoded data information; and a decompressing and decoding module configured to decompress and decode data according to the compressed encoded data information, to obtain space-time-frequency three-domain synchronization information of the ultrafast-pulse optical signal.

Figure 9:
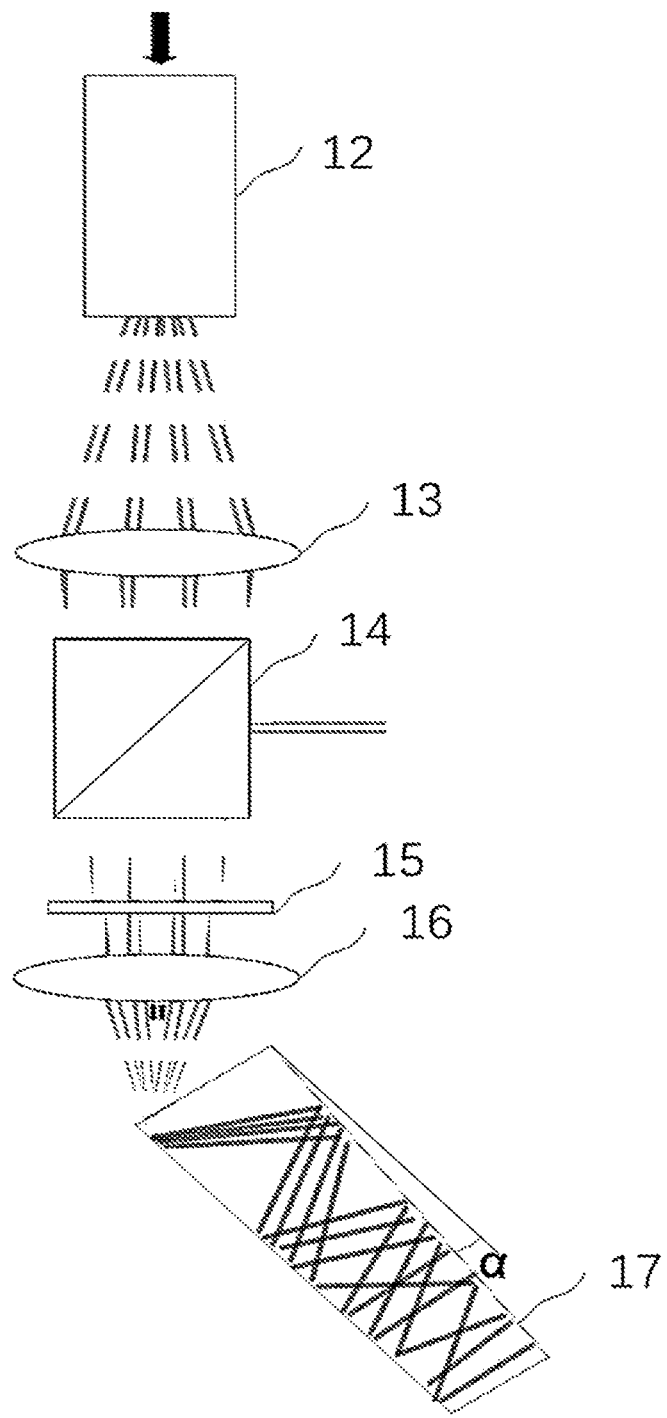
FIG. 9 is a schematic diagram of an optical structure on a plane x-z of the real-time measurement system for ultrafast space-time-frequency three-domain information based on space-time-frequency compression according to an embodiment.

The spatial encoding module is a digital micromirror device. The space-time arrangement module is an acousto-optic modulator. The frequency-space editing module is a diffraction grating. The frequency-time delaying module is a pair of long dielectric-film reflection mirrors placed at a specific angle. As shown in FIG. 9, two long mirrors may be placed at a small angle $\alpha$. When the length of the mirrors and the distance between the long mirrors and the center are constant, the angle at which the long mirrors are placed is proportional to their frequency-time delaying capabilities. Light beams of different frequencies are reflected a plurality of times through the long mirrors to delay time. The compressed encoded data acquisition module is an area array detector such as a charge-coupled device camera. When the area array detector acquires the high-frequency-resolution encoded space-time-frequency synchronized ultrafast-pulse optical signal, signals overlap and are compressed in a space, and pieces of time and frequency information loaded on the spatial information overlap and are compressed synchronously.

Figure 10:
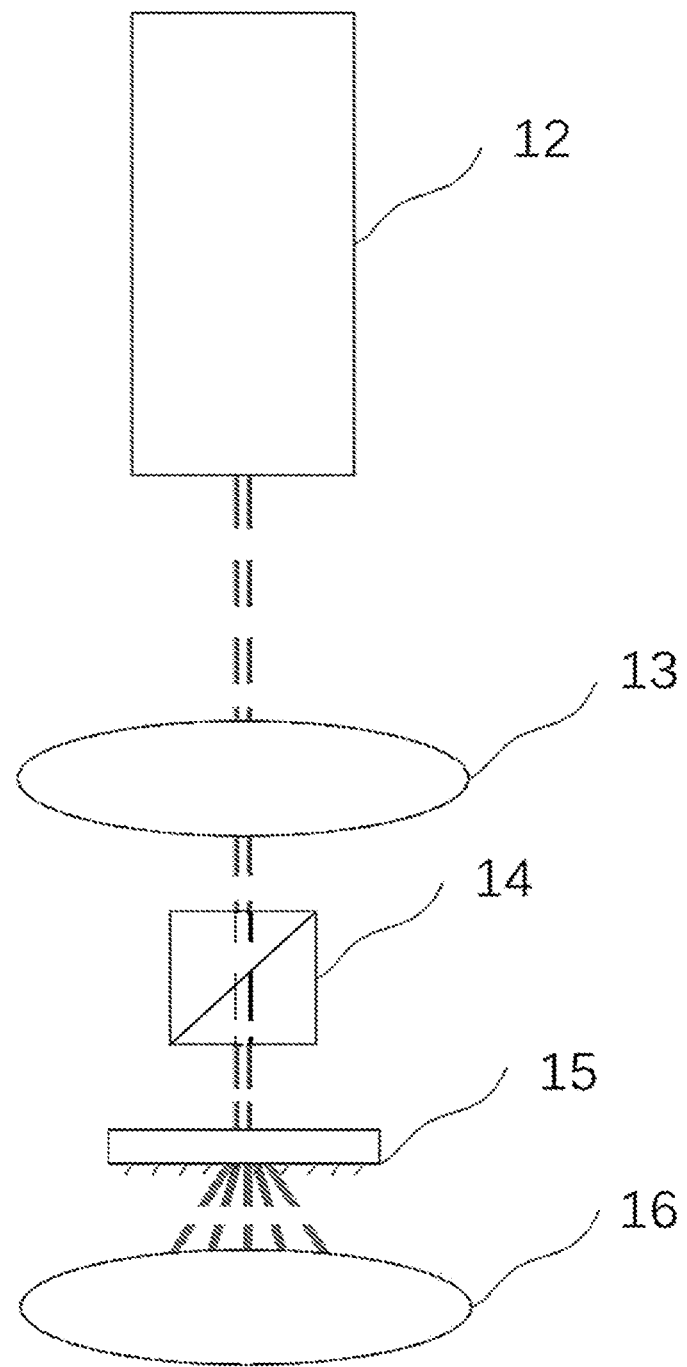
FIG. 10 is a schematic diagram of the optical structure on a plane y-z of the real-time measurement system for ultrafast space-time-frequency three-domain information based on space-time-frequency compression according to an embodiment.

In an embodiment, as shown in FIG. 9 and FIG. 10, an optical structure of the system includes a space-time editor 12, a first lens 13, a second beam splitter 14, a frequency-space editor 15, a second lens 16, and a frequency-time delayer 17. The first lens 13 and the second lens 16 adjust spatial optical signals. The space-time editor 12 loads time information of an ultrafast space-time mode-locked pulse on spatial information. The frequency-space editor 15 loads frequency information of the ultrafast space-time mode-locked pulse on the spatial information. The frequency-time delayer 17 improves the time-frequency resolution of the system. The signal light is outputted through the second optical beam splitter 14.

Ultrafast space-time-frequency three-domain information can be measured in real time by using the method and system provided by this embodiment.

Obviously, the foregoing embodiments of the present invention are only examples for clearly describing the present invention, rather than limiting the implementations of the present invention. Changes or modifications in other different forms can be further made by those of ordinary skill in the art on the basis of the foregoing description. It is unnecessary and impossible to provide exhaustive examples for all implementations. Any modification, equivalent replacement, improvement, and the like made within the spirit and principle of the present invention shall be included within the protection scope of claims in the present invention.

What is claimed is:

1. A real-time measurement method for ultrafast space-time-frequency information based on space-time-frequency compression, comprising:

generating an ultrafast-pulse optical signal in a to-be-observed physical system;

performing intensity-modulated spatial encoding on the ultrafast-pulse optical signal, to obtain an encoded ultrafast-pulse optical signal;

arranging a time-domain series of the encoded ultrafast-pulse optical signal in a horizontal space direction, to obtain a space-time distribution encoding form of the encoded ultrafast-pulse optical signal;

performing frequency spectral processing on the space-time distribution encoding form of the encoded ultrafast-pulse optical signal, and loading frequency information of each ultrafast pulse on vertical spatial information, to obtain an encoded space-time-frequency synchronized ultrafast-pulse optical signal;

performing frequency-time delaying on the encoded space-time-frequency synchronized ultrafast-pulse optical signal, to obtain a high-frequency-resolution encoded space-time-frequency synchronized ultrafast-pulse optical signal;

performing real-time compression and acquisition on the high-frequency-resolution encoded space-time-frequency synchronized ultrafast-pulse optical signal, to obtain compressed encoded data information; and decompressing and decoding data according to the compressed encoded data information, to obtain space-time-frequency three-domain synchronization information of the ultrafast-pulse optical signal.

2. The real-time measurement method for ultrafast space-time-frequency information based on space-time-frequency compression according to claim 1, wherein the ultrafast-pulse optical signal is an ultrafast space-time mode-locked pulse.

3. A real-time measurement system for ultrafast space-time-frequency three-domain information based on space-time-frequency compression, configured to implement the method according to claim 2, and comprising:

an ultrafast-pulse optical signal generation module configured to generate an ultrafast-pulse optical signal in a to-be-observed physical system;

a spatial encoding module configured to perform intensity-modulated spatial encoding on the ultrafast-pulse optical signal, to obtain an encoded ultrafast-pulse optical signal;

a space-time arrangement module configured to arrange a time-domain series of the encoded ultrafast-pulse optical signal in a horizontal space direction, to obtain a space-time distribution encoding form of the encoded ultrafast-pulse optical signal;

a frequency-space editing module configured to perform frequency spectral processing on the space-time distribution encoding form of the encoded ultrafast-pulse optical signal, and load frequency information of each ultrafast pulse on vertical spatial information, to obtain an encoded space-time-frequency synchronized ultrafast-pulse optical signal;

a frequency-time delaying module configured to perform frequency-time delaying on the encoded space-time-frequency synchronized ultrafast-pulse optical signal, to obtain a high-frequency-resolution encoded space-time-frequency synchronized ultrafast-pulse optical signal;

a compressed encoded data acquisition module configured to acquire the high-frequency-resolution encoded space-time-frequency synchronized ultrafast-pulse optical signal, to obtain compressed encoded data information; and a decompressing and decoding module configured to decompress and decode data according to the compressed encoded data information, to obtain space-time-frequency three-domain synchronization information of the ultrafast-pulse optical signal.

4. The real-time measurement system for ultrafast space-time-frequency three-domain information based on space-time-frequency compression according to claim 3, wherein the spatial encoding module is a digital micromirror device.

5. The real-time measurement system for ultrafast space-time-frequency three-domain information based on space-time-frequency compression according to claim 3, wherein the space-time arrangement module is an acousto-optic modulator.

6. The real-time measurement system for ultrafast space-time-frequency three-domain information based on space-time-frequency compression according to claim 3, wherein the frequency-space editing module is a diffraction grating.

7. The real-time measurement system for ultrafast space-time-frequency three-domain information based on space-time-frequency compression according to claim 3, wherein the frequency-time delaying module is a pair of long dielectric-film reflection mirrors placed at a specific angle.

8. The real-time measurement system for ultrafast space-time-frequency three-domain information based on space-time-frequency compression according to claim 3, wherein the compressed encoded data acquisition module is an area array detector, and when the area array detector acquires the high-frequency-resolution encoded space-time-frequency synchronized ultrafast-pulse optical signal, signals overlap and are compressed in space, and pieces of time and frequency information loaded on the vertical spatial information overlap and are compressed synchronously.

9. The real-time measurement system for ultrafast space-time-frequency three-domain information based on space-time-frequency compression according to claim 8, wherein the area array detector is a charge-coupled device camera.

10. The real-time measurement method for ultrafast space-time-frequency information based on space-time-frequency compression according to claim 1, wherein the data is decompressed and decoded by using a two-step iterative shrinkage/thresholding algorithm, to obtain the space-time-frequency three-domain synchronization information of the ultrafast-pulse optical signal.

11. A real-time measurement system for ultrafast space-time-frequency three-domain information based on space-time-frequency compression, configured to implement the method according to claim 10, and comprising:

an ultrafast-pulse optical signal generation module configured to generate an ultrafast-pulse optical signal in a to-be-observed physical system;

a spatial encoding module configured to perform intensity-modulated spatial encoding on the ultrafast-pulse optical signal, to obtain an encoded ultrafast-pulse optical signal;

a space-time arrangement module configured to arrange a time-domain series of the encoded ultrafast-pulse optical signal in a horizontal space direction, to obtain a space-time distribution encoding form of the encoded ultrafast-pulse optical signal;

a frequency-space editing module configured to perform frequency spectral processing on the space-time distribution encoding form of the encoded ultrafast-pulse optical signal, and load frequency information of each ultrafast pulse on vertical spatial information, to obtain an encoded space-time-frequency synchronized ultrafast-pulse optical signal;

a frequency-time delaying module configured to perform frequency-time delaying on the encoded space-timefrequency synchronized ultrafast-pulse optical signal, to obtain a high-frequency-resolution encoded space-time-frequency synchronized ultrafast-pulse optical signal;

a compressed encoded data acquisition module configured to acquire the high-frequency-resolution encoded space-time-frequency synchronized ultrafast-pulse optical signal, to obtain compressed encoded data information; and a decompressing and decoding module configured to decompress and decode data according to the compressed encoded data information, to obtain space-time-frequency three-domain synchronization information of the ultrafast-pulse optical signal.

12. The real-time measurement system for ultrafast space-time-frequency three-domain information based on space-time-frequency compression according to claim 11, wherein the spatial encoding module is a digital micromirror device.

13. The real-time measurement system for ultrafast space-time-frequency three-domain information based on space-time-frequency compression according to claim 11, wherein the space-time arrangement module is an acousto-optic modulator.

14. A real-time measurement system for ultrafast space-time-frequency three-domain information based on space-time-frequency compression, configured to implement the method according to claim 1, and comprising:

an ultrafast-pulse optical signal generation module configured to generate an ultrafast-pulse optical signal in a to-be-observed physical system;

a spatial encoding module configured to perform intensity-modulated spatial encoding on the ultrafast-pulse optical signal, to obtain an encoded ultrafast-pulse optical signal;

a space-time arrangement module configured to arrange a time-domain series of the encoded ultrafast-pulse optical signal in a horizontal space direction, to obtain a space-time distribution encoding form of the encoded ultrafast-pulse optical signal;

a frequency-space editing module configured to perform frequency spectral processing on the space-time distribution encoding form of the encoded ultrafast-pulse optical signal, and load frequency information of each ultrafast pulse on vertical spatial information, to obtain an encoded space-time-frequency synchronized ultrafast-pulse optical signal;

a frequency-time delaying module configured to perform frequency-time delaying on the encoded space-time-frequency synchronized ultrafast-pulse optical signal, to obtain a high-frequency-resolution encoded space-time-frequency synchronized ultrafast-pulse optical signal;

a compressed encoded data acquisition module configured to acquire the high-frequency-resolution encoded space-time-frequency synchronized ultrafast-pulse optical signal, to obtain compressed encoded data information; and a decompressing and decoding module configured to decompress and decode data according to the compressed encoded data information, to obtain space-time-frequency three-domain synchronization information of the ultrafast-pulse optical signal.

15. The real-time measurement system for ultrafast space-time-frequency three-domain information based on space-time-frequency compression according to claim 14, wherein the spatial encoding module is a digital micromirror device.

16. The real-time measurement system for ultrafast space-time-frequency three-domain information based on space-time-frequency compression according to claim 14, wherein the space-time arrangement module is an acousto-optic modulator.

17. The real-time measurement system for ultrafast space-time-frequency three-domain information based on space-time-frequency compression according to claim 14, wherein the frequency-space editing module is a diffraction grating.

18. The real-time measurement system for ultrafast space-time-frequency three-domain information based on space-time-frequency compression according to claim 14, wherein the frequency-time delaying module is a pair of long dielectric-film reflection mirrors placed at a specific angle.

19. The real-time measurement system for ultrafast space-time-frequency three-domain information based on space-time-frequency compression according to claim 14, wherein the compressed encoded data acquisition module is an area array detector, and when the area array detector acquires the high-frequency-resolution encoded space-time-frequency synchronized ultrafast-pulse optical signal, signals overlap and are compressed in space, and pieces of time and frequency information loaded on the vertical spatial information overlap and are compressed synchronously.

20. The real-time measurement system for ultrafast space-time-frequency three-domain information based on space-time-frequency compression according to claim 19, wherein the area array detector is a charge-coupled device camera.

* * * * *